United States Patent [19]

Keramati et al.

[11] 4,356,382
[45] Oct. 26, 1982

[54] DRIP COFFEEMAKER HAVING A CONDENSER ELIMINATING DELIVERY OF STEAM TO THE WATER SPREADER

[75] Inventors: Bahram Keramati, Scotia, N.Y.; Steven C. Bray, Chillicothe, Ill.; Ralph T. Wood, Clifton Park, N.Y.

[73] Assignee: General Electric Company, New York, N.Y.

[21] Appl. No.: 181,955

[22] Filed: Aug. 28, 1980

[51] Int. Cl.³ ............... A47J 31/051; A47J 31/54; F24H 1/12; F04B 19/24
[52] U.S. Cl. ............... 219/297; 99/288; 99/307; 219/283; 219/302; 219/314; 417/208
[58] Field of Search ........ 219/280, 283, 301, 302–305, 219/308, 309, 314; 417/207–209; 99/279–282, 288, 300, 302 R, 304–315

[56] References Cited

U.S. PATENT DOCUMENTS

| | | | |
|---|---|---|---|
| 832,045 | 10/1906 | Dowling | 99/312 |
| 1,459,408 | 6/1923 | Lockett | 99/315X |
| 2,170,225 | 8/1939 | Unge | 417/209 X |
| 2,720,154 | 10/1955 | Graham | 99/312 |
| 2,846,938 | 8/1958 | Brandl | 99/281 |
| 3,691,934 | 9/1972 | Horn et al. | 99/307 X |
| 3,808,961 | 5/1974 | Grossenbacher | 99/281 |
| 4,070,956 | 1/1978 | Brown | 99/304 |
| 4,142,840 | 3/1979 | Kemp | 417/209 |

FOREIGN PATENT DOCUMENTS 2307762 12/1974 Fed. Rep. of Germany ........ 99/281
1569204 11/1980 United Kingdom ............... 219/297

Primary Examiner—Anthony Bartis
Attorney, Agent, or Firm—John F. Cullen; George R. Powers; Leonard J. Platt

[57] ABSTRACT

An electric drip coffeemaker has a generally upright C-shaped housing with a lower horizontal leg having a heated carafe support, an upper horizontal leg having a water spreader, and a vertical leg enclosing an accessible water reservoir. An electrically heated hot water generator in the lower leg below the carafe support has an inlet connected to the reservoir through a one-way inlet valve and an outlet connected to the spreader by tubes through an interposed separate definitive steam condenser located in the vertical leg entirely below the reservoir. The condenser includes a plenum chamber larger in cross section than the connecting tubes and has a single inlet for water from the hot water generator at its bottom and a single outlet to the spreader at its top. A check valve in the chamber outlet permits only unidirectional water outflow from the condenser to create a "scrubbing" effect cleansing the passages of mineral deposits and preventing clogging. The condenser provides a large condensing volume which eliminates deliver of steam to the spreader, thus increasing brewing temperatures, decreasing brewing time and improving quality of the brewed coffee. The lack of steam in the spreader region eliminates condensation on the outer surfaces of the coffeemaker and reduces condensation leaks.

4 Claims, 2 Drawing Figures

DRIP COFFEEMAKER HAVING A CONDENSER ELIMINATING DELIVERY OF STEAM TO THE WATER SPREADER

BACKGROUND OF THE INVENTION

1. Field of the Invention

The invention relates to a brewing apparatus such as a coffeemaker and, more particularly, to an improved drip coffeemaker that interposes a separate definitive condenser or plenum chamber in the tube between the heating source and the spreader for eliminating steaming and raising the brew temperature.

2. Description of the Prior Art

In conventonal electric drip coffeemakers it is common practice to provide a generally C-shaped molded plastic housing with a lower horizontal leg for holding a heated carafe and the other upper horizontal leg forming an overhanging top wall above the carafe and containing a water spreader for dripping hot water through an intermediate coffee brew basket into the carafe. The vertical leg contains an internal water reservoir and heating chamber below it to supply heated water through tube means to a water spreader in the top wall of the housing and into the coffee brew basket. Such coffeemakers have widely replaced the percolator types and this general type as shown in U.S. Pat. No. 3,968,740 may come in numerous sizes including smaller four cup coffeemakers of generally similar construction as shown in U.S. Pat. No. 4,142,840, both patents of common assignment. One of the problems associated with such coffeemakers is excessive steaming which leads to condensation leaks and long brew times and in some cases low brew temperatures. The present invention is an improvement on such conventional drip coffeemakers to overcome these troubles.

SUMMARY OF THE INVENTION

In accordance with the invention, an electric brewing apparatus is provided, specifically a drip-type coffeemaker having an upright C-shaped housing with one horizontal leg having a heated carafe support and the other leg containing a water spreader. The vertical leg encloses an accessible water reservoir with an apertured bottom wall. A pump and heated chamber in the bottom of the housing delivers heated water through tube means to the spreader and then into a coffee basket and to the carafe all in the conventional manner. The invention improves on this combination by providing a separate and distinct definitive condenser or plenum chamber in the tube means with the plenum being larger in cross section than the connecting tube means. The chamber is disposed preferably below the reservoir in the vertical leg of the coffeemaker and between the heated carafe support and the spreader. Thus, the main object of the invention is to provide an improved drip coffeemaker for containing a separate definitive condenser plenum chamber to eliminate steaming over into the spreader and provide higher brewing temperatures to improve the quality of the coffee. A specific structural form of condenser in the combination is disclosed in application Ser. No. 181,996 of common assignment filed Aug. 28, 1980 concurrently herewith.

DESCRIPTION OF THE PREFERRED EMBODIMENT

Figure 1:
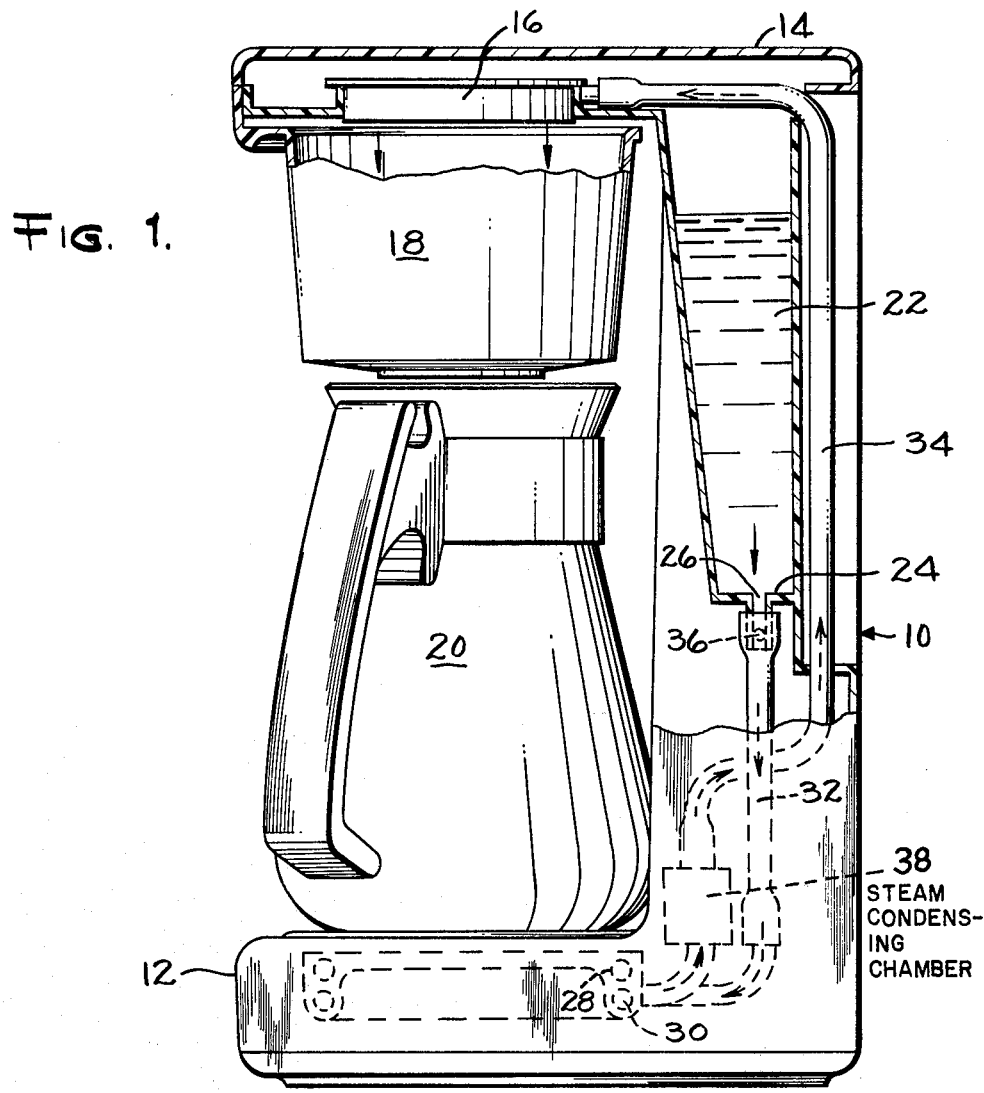
FIG. 1 is a front partially perspective view partly in section and phantom of a typical coffeemaker employing one form of the invention.

Referring to FIG. 1 there is shown an electric drip coffeemaker which generally includes a molded plastic upright C-shaped housing and having a horizontal leg 12 forming a support for receptacles such as a heated carafe with the upper horizontal leg 14 containing a water spreader 16 and extending over the lower leg so that a coffee basket 18 and carafe 20 are supported therebetween in conventional fashion. The third portion or vertical leg 10 of the housing encloses an accessible water reservoir 22 in the upper portion thereof which reservoir is accessible by a removable lid at the top through which water may be poured into the reservoir to start the coffee making operation. To store contained water, reservoir 22 has a bottom wall 24 with a central aperture 26. Water is heated by a sheathed electric resistance heat generator 28, preferably disposed in the lower horizontal leg portion and positioned above the water tube 30 for heating water in the tube and for maintaining an appropriate temperature or "keeps warm" feature for any brewed coffee in carafe 20. Water is directed from reservoir 22 through aperture 26 and directly into the heating area in the hot water generator through tube means 32 into the base tube 30 where it is boiled to form a pump action in tube 30 and delivered by separate conduit or tube means 34 up and to the spreader 16 as hot water to drip into the coffee basket 18 and then sent to the carafe 20 as brewed coffee.

The structure thus far described is conventional. Generally check valves, such as 36, may be supplied either at the reservoir outlet or the hot water generator outlet (not shown) or both to act as one-way valves. Such structure, with slight variations, is conventional in most of the molded plastic coffeemakers.

Figure 2:
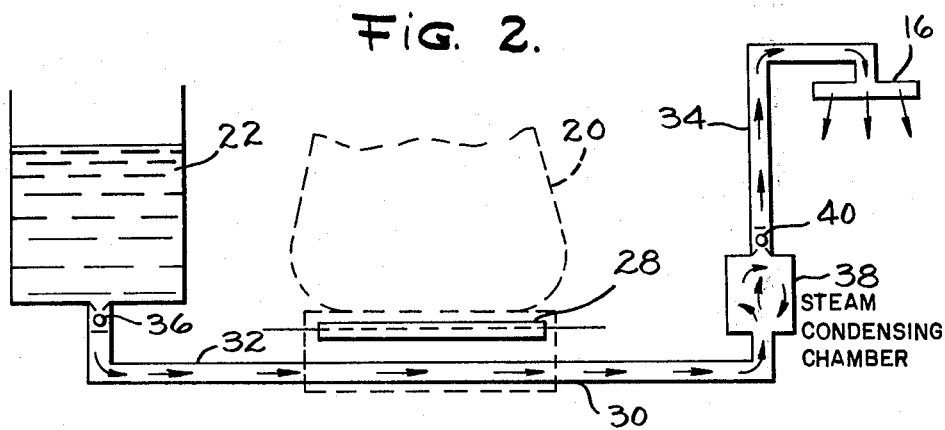
FIG. 2 is a schematic of the flow path using another form of the invention.

Generally, current drip coffeemakers have excessive steaming which is carried from the hot water generator through the outlet tube and into the spreader, which excessive steaming leads to condensation leaks and long brew times and, in some cases, low brew temperatures. The present invention eliminates steaming and vapor locks caused by a pressure stall that may occur in the tubing between reservoir 22 and spreader 16. To this end, the invention employs a separate definitive condenser or plenum chamber 38 placed in the outlet line of the heater or hot water generator 28, which outlet line is the only connection between the hot water generator and the spreader. Thus, all the water from the base flows, as shown, unidirectionally through the condenser on its' way to the basket. The condenser is larger in cross section that the tube means connecting it as seen in FIG. 2 and may be conveniently disposed in the base portion of the brewing apparatus as seen in FIG. 1 in space available next to tube means 32. The condenser is a direct contact condensation chamber in which steam that is generated in the hot water generator 28 by the water partially evaporating inside the hot water generator tube creates a pressure that closes the inlet valve 36 and expels liquid followed by steam from the hot water generator. Because of the strong peripheral heat flow variation in the hot water generator the bulk of the expelled liquid is below saturation temperature. As a result, when the steam and expelled liquid enter the larger plenum chamber 38 direct contact condensation of steam takes place. This process results in a pressure drop which causes the reservoir exit valve 36 to open and induce more cold water from the reservoir. After a short period in the heating area, the evaporation or boiling process begins again. This cycling pumping process assures the delivery of hot water from the condenser or plenum 38 without steaming. In other words, it is desired to pass hot water to the spreader 16 and not steam. While not necessary, preferably the condenser inlet tube 32 and outlet tube 34 are substantially equal in cross section. The plenum 38 removes the steam by condensation and passes substantially all hot water directly to spreader 16 thus improving the coffee brewing. Additionally, the lack of steam in the spreader region eliminates the condensation of the steam on the outer surfaces of the coffeemaker reducing condensation leaks. Also, since brewing time is not wasted in delivering steam to the spreader, the brewing time is reduced.

Another form of the invention, as shown in FIG. 2, with the interposition of valve 40 in the exit line after the condenser and preferably adjacent its exit leading to spreader 16 has been found to improve clogging characteristics. The valve prevents heated water from moving back into the hot water generator to be further heated to precipitate minerals into the passages. Also, by improving the flow characteristics, i.e., maintaining a series flow in essentially unidirectionally or in only one direction, there is a "scrubbing" effect to cleanse the passages of deposits. The use of such valve in combination with the plenum 38 herein substantially at the outlet from plenum 38 as shown in FIG. 2 further improves overall operation by reducing clogging as well as reducing steaming. The plenum 38 alone of FIG. 1 reduces the steaming which is objectionable since steam does not make coffee but hot water does. The plenum 38 in combination in FIG. 2 with the one-way outlet valve 40 improves both steaming and clogging characteristics for an overall general improvement on the structure using a condenser or plenum 38 alone and the claims herein are directed to both versions without the exit valve of FIG. 1 and with the valve of FIG. 2.

The operation that generally occurs in the condenser/valve portion of FIG. 2 is that as steam is formed in the hot water generator it closes the inlet valve 36 by building up internal pressure and opens the outlet valve 40, delivering heated water to the spreader 16. When the generated steam reaches the condenser, the condenser or plenum 38 drops the pressure by direct condensation of the generated steam and, with the pressure dropped, the inlet valve 36 opens to pass more water into the tube 30. Thus, the invention herein with the condenser alone of FIG. 1 adds an improvement to drop coffeemakers by eliminating steaming and, with the addition of exit valve 40 of FIG. 2 improves upon the basic condenser invention herein by adding the advantage of reducing clogging of the lines due to mineral deposition.

While we have hereinbefore described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

We claim:

1. In a drip coffeemaker having an upright C-shaped housing, one horizontal leg having a heated carafe support and the other a water spreader, the vertical leg enclosing an accessible water reservoir with an apertured bottom wall and a pump and hot water generator in the bottom of said housing for delivering heated water through tube means to the spreader, the improvement comprising, a separate plenum chamber with a single inlet and outlet connected in said tube means,
said chamber being connected in series flow relationship in said tube between the hot water generator and said spreader,
a one-way inlet valve between the reservoir and hot water generator,
a one-way outlet valve adjacent the chamber exit preventing back-flow through the chamber,
said chamber and outlet valve being connected in series flow relationship in said tube between the hot water generator and said spreader and disposed as the only connected component between the heated carafe support and said spreader so all water from the generator flows unidirectionally through said plenum chamber to said spreader to eliminate steaming and reduce clogging.

2. Apparatus as described in claim 1 wherein said separate plenum chamber is larger in cross section than said tube means.

3. Apparatus as described in claim 2 wherein the inlet to and outlet from said separate plenum chamber are substantially equal in cross section.

4. Apparatus as described in claim 3 wherein said separate plenum chamber is disposed below said reservoir in the vertical leg of the coffeemaker.

* * * * *